United States Patent

Locatell, Jr. et al.

[11] 4,405,788
[45] Sep. 20, 1983

[54] BICYCLO NITROGENHETEROCYCLIC SUBSTITUTED SULFOFLUORESCEINS, FLUORESCEINS AND XANTHENES

[75] Inventors: Louis Locatell, Jr., Wellesley Hills; Charles M. Zepp, Boylston; Ronald F. Cieciuch, Brookline, all of Mass.

[73] Assignee: Polaroid Corporation, Cambridge, Mass.

[21] Appl. No.: 106,898

[22] Filed: Dec. 26, 1979

[51] Int. Cl.³ .................. C07D 405/04; C07D 405/14
[52] U.S. Cl. ..................... 546/165; 548/454; 548/455; 549/223; 549/227; 260/330.9
[58] Field of Search .............. 546/165; 260/326.11 R, 260/330.9, 336; 548/454, 455

[56] References Cited

U.S. PATENT DOCUMENTS

| | | | |
|---|---|---|---|
| 2,197,846 | 4/1940 | Wolff et al. | 548/454 |
| 3,883,529 | 12/1972 | Austin | 260/336 |
| 3,956,300 | 8/1972 | Austin | 260/249.5 |
| 4,237,281 | 12/1980 | Long | 544/99 |
| 4,264,507 | 4/1981 | Borror | 260/336 |
| 4,290,950 | 9/1981 | Cournoyer et al. | 548/455 |
| 4,290,951 | 9/1981 | Foley et al. | 548/455 |

FOREIGN PATENT DOCUMENTS

| | | | |
|---|---|---|---|
| 2907437 | 8/1978 | Fed. Rep. of Germany | 260/336 |
| 5050244 | 10/1978 | Japan | 260/336 |
| 1423346 | 2/1972 | United Kingdom | 260/336 |
| 2016631 | 9/1979 | United Kingdom | 260/336 |

OTHER PUBLICATIONS

Ramanouskas et al., Chem. Abst. vol. 88, Abst. #192734d.

*Primary Examiner*—Donald G. Daus
*Assistant Examiner*—D. B. Springer
*Attorney, Agent, or Firm*—Gaetano D. Maccarone

[57] ABSTRACT

There are described novel dye compounds which are represented by the formula

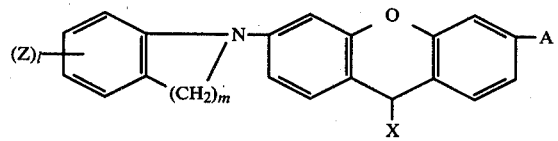

wherein A is

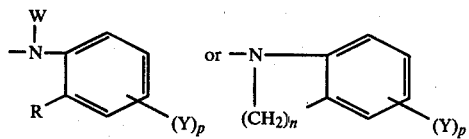

X is H, alkyl, aryl such as phenyl or naphthyl, or substituted aryl; W is H or alkyl; R is H or alkyl; Z and Y are each H or monovalent radicals; l and p are each 1 or 2 and m and n are each integers of from 2–6.

9 Claims, No Drawings

BICYCLO NITROGENHETEROCYCLIC SUBSTITUTED SULFOFLUORESCEINS, FLUORESCEINS AND XANTHENES

BACKGROUND OF THE INVENTION

This application relates generally to novel compounds and, more particularly to compounds which are useful as dyes and as intermediates for the preparation of compounds which are useful in photographic applications.

It is therefore the object of this invention to provide novel compounds.

It is another object of the invention to provide compounds which are useful as dyes.

It is a further object to provide compounds which are useful as intermediates for the preparation of compounds which are useful in photography.

BRIEF SUMMARY OF THE INVENTION

These and other objects and advantages are accomplished in accordance with the invention by providing novel compounds which are represented by the formula

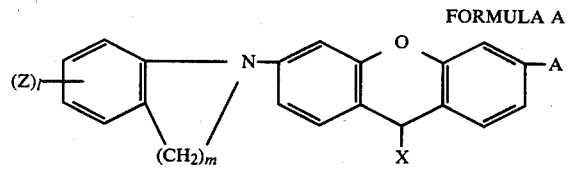

FORMULA A wherein A is

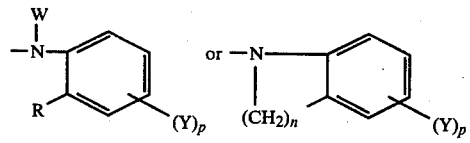

X is H, alkyl, preferably having from 1 to 6 carbon atoms, aryl such as phenyl or naphthyl, or aryl substituted with substituents such as $CO_2^\ominus$, $SO_3^\ominus$ or alkyl, preferably having from 1 to 6 carbon atoms; W is H or alkyl, preferably having from 1 to 6 carbon atoms; R is H or alkyl, preferably having from 1 to 6 carbon atoms; Z and Y are each H or monovalent radicals; l and p are each 1 or 2; and m and n are each integers of from 2 to 6.

Z and Y may be the same or different and may be H or any suitable monovalent radical. Typical suitable monovalent radicals include, for example, alkyl, amino, nitro, carboxy, hydroxy, halogen, sulfonamido, sulfonic acid, sulfone, thioether, cyano, acyl, etc.

In a preferred embodiment of the invention X is

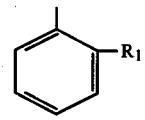

wherein $R_1$ is H, $CO_2^\ominus$, $SO_3^\ominus$ or alkyl, preferably having from 1 to 6 carbon atoms. In a particularly preferred embodiment $R_1$ is $SO_3^\ominus$ since such compounds typically exhibit desirable stability in alkali.

It will be understood that the compounds within Formula A can be represented by the resonance form of their structure such as, for example,

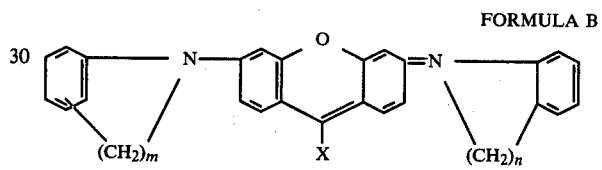

FORMULA B

Both resonance forms of the compounds are intended to be encompassed by Formula A.

DESCRIPTION OF THE PREFERRED EMBODIMENTS

Specific dyes which are within the scope of Formula A are represented by the following structural formulas:

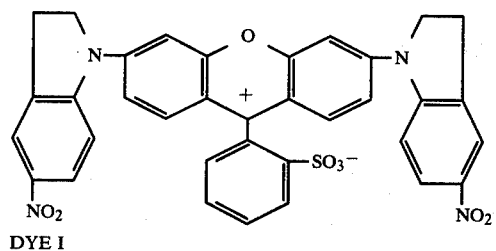

DYE I

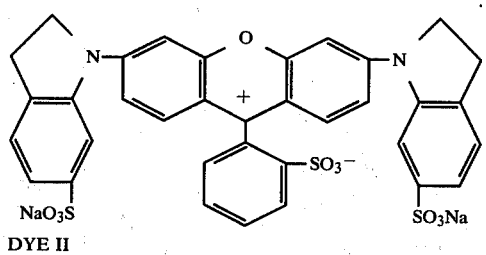

DYE II

-continued

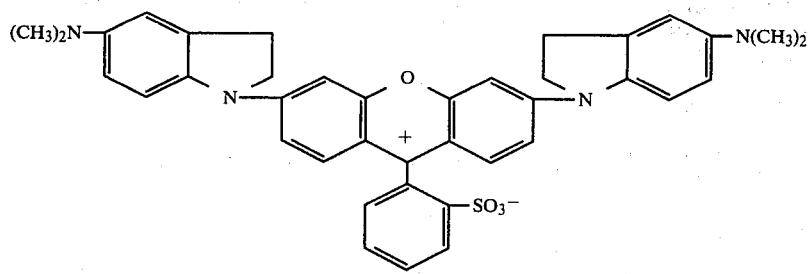

DYE III

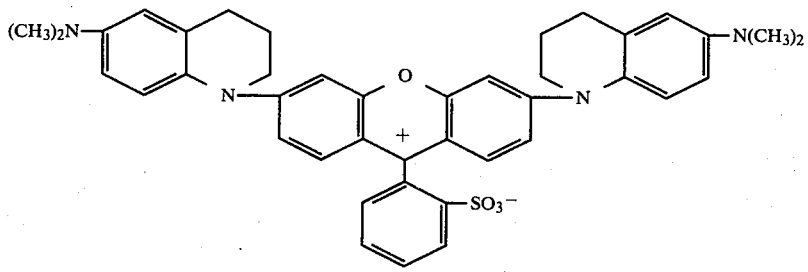

DYE IV

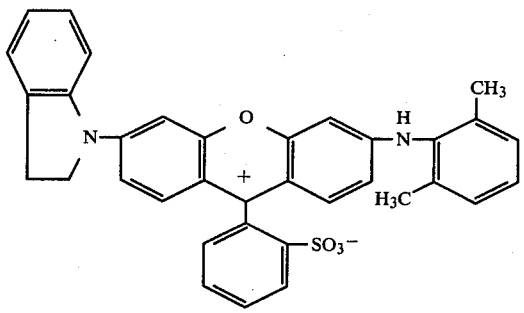

DYE V

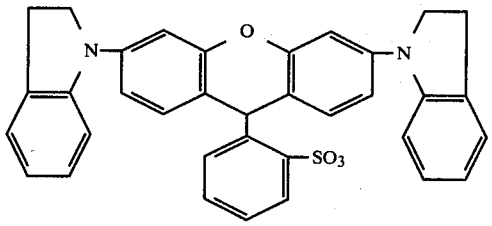

DYE VI

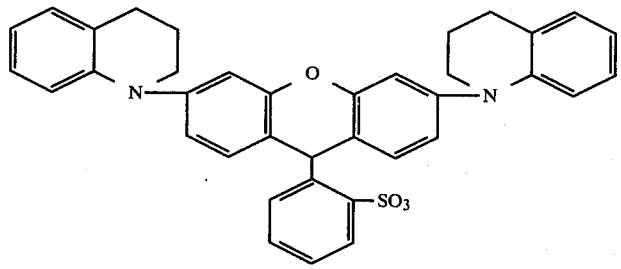

DYE VII

The novel compounds may be prepared by reactions which are known in the art. For example, the compounds can be prepared by reacting dichlorosulfonefluorescein with indoline or an appropriate substituted indoline compound. To form compounds wherein the indolinyl end groups have different substituents, dichlorosulfonefluorescein can be reacted with indoline or an appropriate substituted indoline to form the monochloro intermediate and the latter reacted with indoline or a different substituted indoline to obtain the desired product. Compounds having one indolinyl end group and an anilino end group may be prepared by reacting dichlorosulfonefluorescein with aniline or a substituted aniline to form a monochloro intermediate which is then reacted with indoline as a substituted indoline to provide the desired dye.

As mentioned previously, the compounds of the invention are useful as dyes and also as intermediates in the preparation of compounds which are useful in photography. The compounds within Formula A may be employed as intermediates in the preparation of the image dye-providing materials disclosed and claimed in copending, commonly assigned patent application Ser. No. 106,506, filed on even date herewith, now U.S. Pat. No. 4,267,251. In addition, certain of the compounds within Formula A may be utilized as intermediates in the preparation of xanthene compounds which are useful as light-screening dyes as is described in copending, commonly assigned patent applications Ser. No. 106,905, and Ser. No. 106,938, filed on even date herewith, now U.S. Pat. No. 4,258,118 and 4,258,119, respectively.

The invention will now be described further in detail with respect to specific preferred embodiments by way of examples, it being understood that these are intended to be illustrative only and the invention is not intended to be limited to the materials, conditions, process parameters, etc. recited therein. All parts and percentages are by weight unless otherwise indicated.

EXAMPLE I

A mixture of 2.0 g (0.005 m) of dichlorosulfonefluorescein, 1.6 g (0.01 m) of 5-nitroindoline, 0.2 g of magnesium oxide and 10 ml of dimethylsulfoxide was heated at 135° C. until all the starting materials were gone (about 5 hours) as indicated by thin layer chromatography (10/90 methanol/chloroform, by volume). Water (200 ml) was added and the reaction mixture was heated to boiling and the solid recovered by filtration. After washing with hot water, the product, dye I, was dried to give 2.6 g (80% yield) as a bronze solid, $\lambda max = 624$ nm, $\epsilon = 110,000$.

EXAMPLE II

A 3-neck 500 ml round bottom flask containing 210 ml of 18% fuming $H_2SO_4$ was cooled to 0° C. in an ice bath and 50 g of indoline were added, dropwise, with stirring at a rate such that the temperature of the mixture was held at below 35° C. (about 45 minutes). The resulting brown solution was placed in an oil bath at 135° C. and stirred at that temperature for ½ hour. After cooling, the solution was poured onto 500 g of ice and formed a clear, pale brown solution. After scratching with a glass rod, the desired product, indoline-6-sulfonic acid, began to crystallize out of solution. The aqueous mixture was cooled to 5° C. and the solid product recovered by filtration. The solid was washed three times with cold water, once with acetone and dried to give 69 g (82% yield) of pure indoline-6-sulfonic acid as a white solid.

A mixture of approximately 4 g (0.02 m) of indoline-6-sulfonic acid, approximately 4 g (0.01 m) of dichlorosulfonefluorescein, approximately 0.4 g of magnesium oxide and about 10 ml of dimethylsulfoxide was heated at 135° C. until the starting materials were gone. The reaction mixture was poured into aqueous HCl and the crude dye was isolated by filtration. After the crude dye was dissolved in dilute sodium carbonate, the solution was filtered, acidified with HCl and the dye precipitated by the addition of sodium chloride. The dye was isolated by filtration, washed with hot water and dried to give a quantitative yield of dye II as a cyan solid, $\lambda max = 637$ nm, $\epsilon = 72,000$.

EXAMPLE III

To a solution of 11.9 g (0.1 m) of indoline in 50 ml of acetic acid there were added dropwise 10.2 g of acetic anhydride. The solution was heated for 15 minutes on a steam bath and 35 ml of water added to the hot solution. After cooling, acetylindoline crystallized out as white plates which were isolated and dried to give 13.7 g (85% yield).

To a solution of 10.0 g (0.062 m) of acetylindoline in 40 g of ice-cold conc. sulfuric acid which was placed in a dry ice-acetone bath to maintain the temperature at $-5°$ C., there was added dropwise and with stirring, a solution of 5.7 g of conc. nitric acid in 11.5 g of conc. sulfuric acid. After addition of the nitrating acids, the solution was stirred at 0° C. for 45 minutes and then poured onto 200 g of ice. The crude 5-nitroacetylindoline was collected by filtration and washed well with water. After drying overnight the crude product was recrystallized from 500 ml of isopropanol to give 10.0 g (70% yield) of 5-nitroacetylindoline as yellow needles, m.p. 172°–174° C. Another recrystallization from isopropanol gave yellow needles, m.p. 175°–176° C.

A mixture of 9.0 g (0.44 m) of 5-nitroacetylindoline, 10 ml of 37% formalin solution, 150 ml of ethanol and 1 g of Pd/C catalyst was hydrogenated overnight in a Parr bottle at an initial hydrogen pressure of 45 psi. The catalyst was then filtered off and the ethanol removed by evaporation to give a white solid which was recrystallized from isopropanol to give 7.0 g (79% yield) of 5-N,N dimethylaminoacetylindoline as colorless plates, m.p. 139°–141° C.

A mixture of 6.0 g (0.03 m) of 5-N,N dimethylaminoacetylindoline in 25 ml of conc. hydrochloric acid was heated on a steam bath for 45 minutes. The pale yellow solution which resulted was added to 100 g of ice and nitrogen gas was bubbled through the mixture for 15 minutes. Solid potassium carbonate was added to the mixture until it was basic and the precipitated oil picked up in chloroform, dried and evaporated to give 4.5 g (96% yield) of 5-N,N dimethylaminoindoline as a pale yellow oil.

A mixture of approximately 3.2 g (0.02 m) of 5-N,N dimethylaminoindoline, approximately 4.0 g (0.01 m) of dichlorosulfonefluorescein, approximately 0.4 g of magnesium oxide and about 10 ml of dimethysulfoxide was heated at 135° C. until thin layer chromatography (10/90 methanol/chloroform by volume) of an aliquot showed that the reaction had gone to completion. The reaction mixture was poured into water and the crude dye III was extracted with chloroform. The chloroform was dried and evaporated to give the crude dye. A pure sample of the dye ($\mu max = 750$ nm) was obtained by preparative thin layer chromatography using Whatman PKIF 1000 micron plates.

EXAMPLE IV

To a solution of 26.6 g (0.02 m) of tetrahydroquinoline in 50 ml of pyridine, cooled to 0° C., there were added 28.1 g (0.02 m) of benzoyl chloride dropwise and with stirring at a rate such the temperature was kept below $-5°$ C. After addition was complete, the mixture was stirred at room temperature for 1 hour and then poured into a separatory funnel containing 500 ml of water and 50 ml of conc. hydrochloric acid. Ethyl ether (300 ml) was added to the funnel and the mixture shaken until all of the precipitated oil had dissolved in the ether. After washing with water, the ether layer was filtered through anhydrous calcium sulfate and evaporated to a volume of about 150 ml. Petroleum ether (100 ml) was added to the solution which was then cooled in a refrigerator to give 35.7 g (75% yield) of 1-benzoyltetrahydroquinoline as colorless crystals, m.p. 80°–81° C.

To a solution of 14.7 g (0.062 m) of 1-benzoyltetrahydroquinoline in 40 g of ice-cold conc. sulfuric acid which was placed in a dry ice-acetone bath to maintain the temperature at −5° C., there was added dropwise and with stirring, a solution of 5.7 g of conc. nitric acid in 11.5 g of conc. sulfuric acid. After addition of the nitrating acids, the solution was stirred at 0° C. for 45 minutes and then poured onto 200 g of ice. The crude nitration product was taken up in chloroform, washed with water and dried. Evaporation of the chloroform gave a solid which was recrystallized from isopropanol. The solid which separated was a mixture of about equal amounts of the 6- and 7-nitro isomers. The yield was 9.0 g (51% yield).

A mixture of 9.0 g of the nitro isomer mixture, 7.3 g of 37% formalin, 150 ml of ethanol and 1 g of Pd/C catalyst was hydrogenated overnight in a Parr bottle at an initial hydrogen pressure of 40 psi. After the catalyst was filtered off and the filtrates were evaporated an oil was obtained. The oil was dissolved in 50 ml of hot isopropanol and on cooling the pure 6-dimethylamino isomer crystallized out as pale yellow crystals

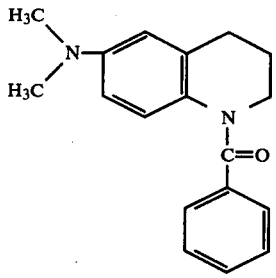

The yield was 3.3 g (37%).

A solution of 3.3 g (0.012 m) of the 6-dimethylamino compound in 15 ml of conc. hydrochloric acid was heated on a steam bath for three hours. During this time benzoic acid began to crystallize out. When thin layer chromatography (50/50 diethyl ether/petroleum ether by volume) showed that all the benzamide was gone and only one product spot, the reaction mixture was poured onto 100 g of ice which was basicified with 50% sodium hydroxide solution. The oil which formed was taken up with ether, filtered through anhydrous calcium sulfate and the filtrate evaporated to give a pale yellow oil which solidified on cooling. The solid was recrytallized from petroleum ether to give 1.5 g (72% yield) of

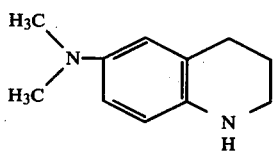

as a white powder, m.p. 54°–55° C.

A mixture of approximately 3.6 g (0.02 m) of this product, approximately 4.0 g (0.01 m) of dichlorosulfonefluorescein, approximately 0.4 g of magnesium oxide and about 10 ml of dimethylsulfoxide was heated to 135° C. until thin layer chromatography (10/90 methanol/chloroform, by volume) of an aliquot showed that the reaction had gone to completion. The reaction mixture was poured into water, extracted with chloroform and dried over anhydrous calcium sulfate. The crude product, dye IV, was recovered, dried and purified by preparative thin layer chromatography using Whatman PKIF 1000 micron plates to give pure dye IV, λmax=685 nm, ε=35,000.

EXAMPLE V

To a solution of 4.05 gms (0.01 m) of dichlorosulfonefluorescein in 20 ml of methanol there were added 4.8 gms (0.04 m) of 2,6-dimethylaniline. The solution was refluxed for three hours and poured into 100 ml of 10% HCl. The resulting suspension was stirred for 15 minutes and filtered to provide an orange solid represented by the formula

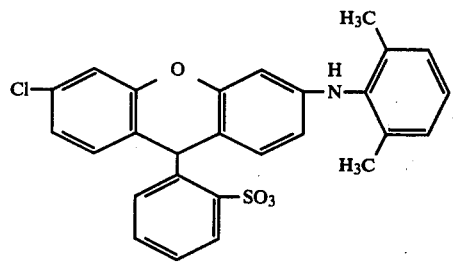

The orange solid showed essentially one spot with thin layer chromatography.

A solution of 2.45 gms (0.005 m) of the previous product in 15 ml of methanol was prepared and to it there were added 3.4 gms (0.02 m) of indoline. The solution was refluxed until thin layer chromatography showed that no more of the orange solid was present. The mixture was poured into 100 ml of 10% HCl and then collected by filtration. The solid was washed with water and dried to give 2.5 gms (87% yield of dye V, $\lambda_{max}$=577 nm.

Although the invention has been described with respect to specific preferred embodiments, it is not intended to be limited thereto but rather those skilled in the art will recognize that variations and modifications may be made therein which are within the spirit of the invention and the scope of the appended claims.

What is claimed is:

1. A compound represented by the formula

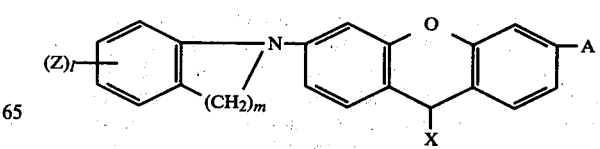

where A is

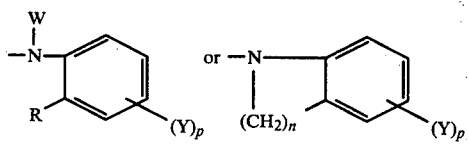  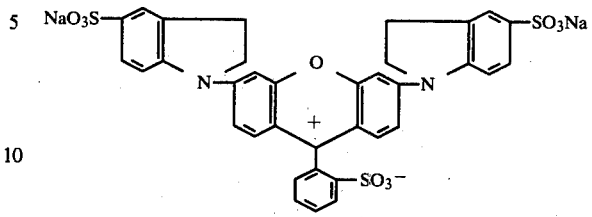

X is H, alkyl having from 1 to 6 carbon atoms, phenyl, naphthyl, phenyl substituted with $CO_2^\ominus$, $SO_3^\ominus$ or alkyl having from 1 to 6 carbon atoms; or naphthyl substituted with $CO_2^\ominus$, $SO_3^\ominus$ or alkyl having from 1 to 6 carbon atoms; W is H or alkyl having from 1 to 6 carbon atoms; R is H or alkyl having from 1 to 6 carbon atoms; Z and Y are each H or a monovalent radical selected from the group consisting of —$CH_3$, —$NO_2$, —$SO_3Na$ and —$N(CH_3)_2$; m and n are each integers of from 2 to 6; and l and p are each 1 or 2.

2. The compound as defined in claim 1 wherein X is

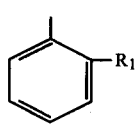

wherein $R_1$ is H, alkyl having from 1 to 6 carbon atoms, $CO_2^\ominus$ or $SO_3^\ominus$.

3. The compound as defined in claim 2 wherein $R_1$ is $SO_3^\ominus$.

4. The compound as defined in claim 1 which is represented by the formula

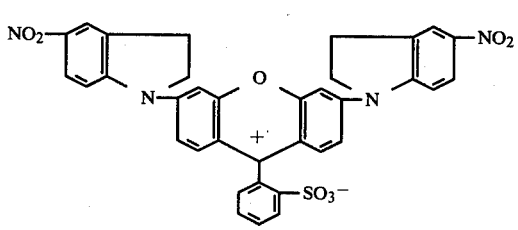

5. The compound as defined in claim 1 which is represented by the formula

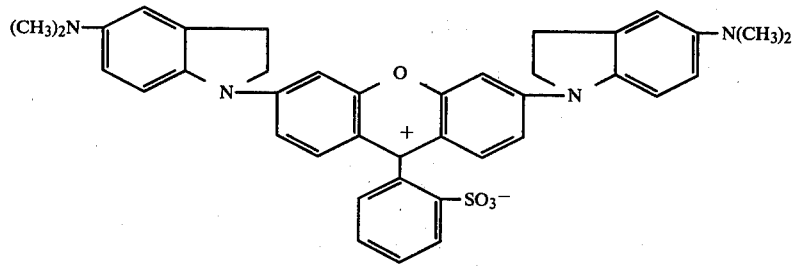

6. The compound as defined in claim 1 which is represented by the formula

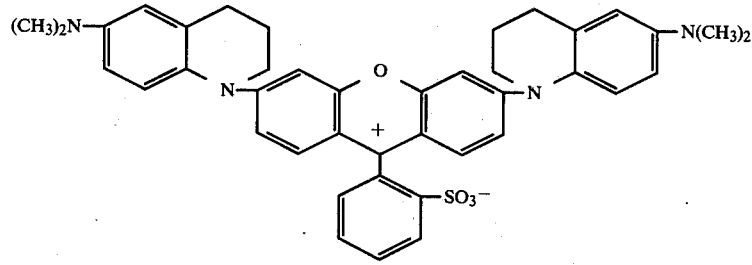

7. The compound as defined in claim 1 which is represented by the formula

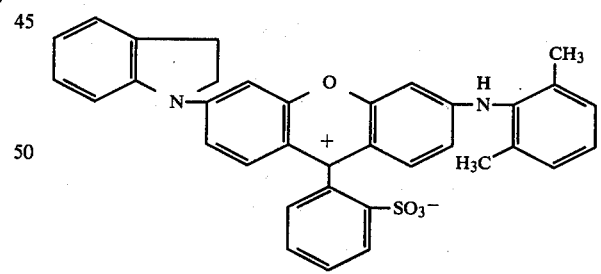

8. The compound as defined in claim 1 which is represented by the formula

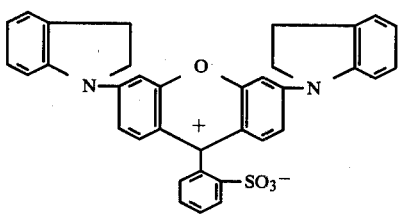

9. The compound as defined in claim 1 which is represented by the formula

* * * * *